(12) United States Patent
Verbeek et al.

(10) Patent No.: US 11,644,127 B2
(45) Date of Patent: May 9, 2023

(54) BRACKET FOR CABLE INSTALLATIONS

(71) Applicant: Panduit Corp., Tinley Park, IL (US)

(72) Inventors: Michael B. Verbeek, Crown Point, IN (US); Brian K. Rohder, Plainfield, IL (US)

(73) Assignee: Panduit Corp., Tinley Park, IL (US)

( * ) Notice: Subject to any disclaimer, the term of this patent is extended or adjusted under 35 U.S.C. 154(b) by 1 day.

(21) Appl. No.: 17/443,612

(22) Filed: Jul. 27, 2021

(65) Prior Publication Data
US 2022/0034431 A1 Feb. 3, 2022

Related U.S. Application Data

(60) Provisional application No. 63/057,989, filed on Jul. 29, 2020.

(51) Int. Cl.
*F16L 3/24* (2006.01)
*H02G 3/04* (2006.01)
*F16L 3/137* (2006.01)

(52) U.S. Cl.
CPC .............. *F16L 3/2431* (2019.08); *F16L 3/137* (2013.01); *H02G 3/0456* (2013.01)

(58) Field of Classification Search
CPC ........ H02G 3/0456; F16L 3/137; F16L 3/245; F16L 3/243; F16L 3/2431
USPC ............................................... 248/72, 223.41
See application file for complete search history.

(56) References Cited

U.S. PATENT DOCUMENTS

| | | | | |
|---|---|---|---|---|
| 2,327,326 A | * | 8/1943 | Churchill | F16L 3/24 174/40 CC |
| 2,329,894 A | * | 9/1943 | Hall | F16L 3/12 174/40 CC |
| 2,456,553 A | * | 12/1948 | Churchill | H02G 3/32 248/229.16 |
| 2,504,086 A | * | 4/1950 | Peters, Jr. | F16B 5/121 248/71 |
| 3,036,801 A | * | 5/1962 | Cemashko | F16L 3/24 174/163 R |
| 3,536,281 A | * | 10/1970 | Attore | F16L 3/24 24/339 |
| 4,440,374 A | | 4/1984 | Achille | |
| D280,597 S | | 9/1985 | Fortsch | |
| 6,643,900 B2 | | 11/2003 | Jährling | |
| 8,480,041 B2 | | 7/2013 | Myers | |
| 9,548,598 B2 | | 1/2017 | Tally et al. | |
| 9,625,059 B2 | | 4/2017 | Meister | |
| 9,719,300 B2 | | 8/2017 | Sylvester et al. | |

(Continued)

FOREIGN PATENT DOCUMENTS

WO 2019032276 A1 2/2019

*Primary Examiner* — Christopher Garft
(74) *Attorney, Agent, or Firm* — Christopher S. Clancy; James H. Williams; Aimee E. McVady

(57) ABSTRACT

A bracket that secures a cable to a strut-style ladder rung that has a rectangular cross-section with an opening along a lower side. The bracket has a spring flange portion, a latch flange portion, and a cable attachment portion. The spring flange portion is sized to be inserted in the opening of the ladder rung. The spring flange portion provides a spring force against the lower side of the ladder rung. The latch flange portion engages at least two sides of the ladder rung in a latched position. The cable attachment portion receives a cable tie to secure the cable to the bracket and attached ladder rung.

11 Claims, 12 Drawing Sheets

(56) References Cited

U.S. PATENT DOCUMENTS

| | | | |
|---|---|---|---|
| 9,882,365 B2 | 1/2018 | Sylvester et al. | |
| 10,246,941 B2 | 4/2019 | Sylvester et al. | |
| 10,253,905 B2 | 4/2019 | Martin | |
| 10,316,991 B2 | 6/2019 | Gallion | |
| 10,407,985 B2 | 9/2019 | Sylvester et al. | |
| 10,415,616 B2 | 9/2019 | Nehls | |
| 10,612,573 B2 | 4/2020 | Recket et al. | |
| 2016/0025244 A1* | 1/2016 | Tally | H02G 3/32 29/428 |
| 2021/0396333 A1* | 12/2021 | Kossak | F16L 3/137 |

* cited by examiner

US 11,644,127 B2

BRACKET FOR CABLE INSTALLATIONS

CROSS REFERENCE TO RELATED APPLICATION(S)

This application claims benefit to U.S. Provisional Patent Application Ser. No. 63/057,989, filed on Jul. 29, 2020, the entirety of which is hereby incorporated by reference herein.

TECHNICAL FIELD

The present application generally relates to a bracket for securing cables to the rungs of a ladder rack.

BACKGROUND

Electrical cables or bundles of cables are supported by ladder racks. Conventional cable installations in ladder racks require small cables or small bundles of cables to be secured to the ladder rungs with cable ties.

SUMMARY OF THE INVENTION

The present invention is directed to a bracket used to secure a cable to a strut style ladder rung. The ladder rung has a rectangular cross-section with an opening along a lower side. The bracket has a spring flange portion, a latch flange portion, and a cable attachment portion. The spring flange portion is sized to be inserted in the opening of the ladder rung. The spring flange portion provides a spring force against the lower side of the ladder rung. The latch flange portion engages at least two sides of the ladder rung in a latched position. The cable attachment portion receives a cable tie for securing a cable to the bracket and attached ladder rung.

BRIEF DESCRIPTION OF THE DRAWINGS

FIG. 7A illustrates an enlarged side view of the spring flange portion of the bracket of FIG. 7 with a non-slip liner incorporated into the spring flange portion.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Cable installations in ladder racks require small cables or small bundles of cables to be secured to the ladder rungs with cable ties. The cable ties are either secured around the ladder rungs and cables at a 45-degree angle across the cables or a 90-degree, figure-eight configuration around the cables. The 45-degree angle cable-tie configuration has a tendency of cutting the cable insulation with the edge of the cable tie. To prevent this abrasion by the cable tie, additional tie coatings or sleeving needs to be utilized to cushion the edge of the cable tie against the cable, which increases costs and installation time. The figure-eight configuration is a more complex installation and therefore requires additional installation time which also increases costs.

Figure 1:
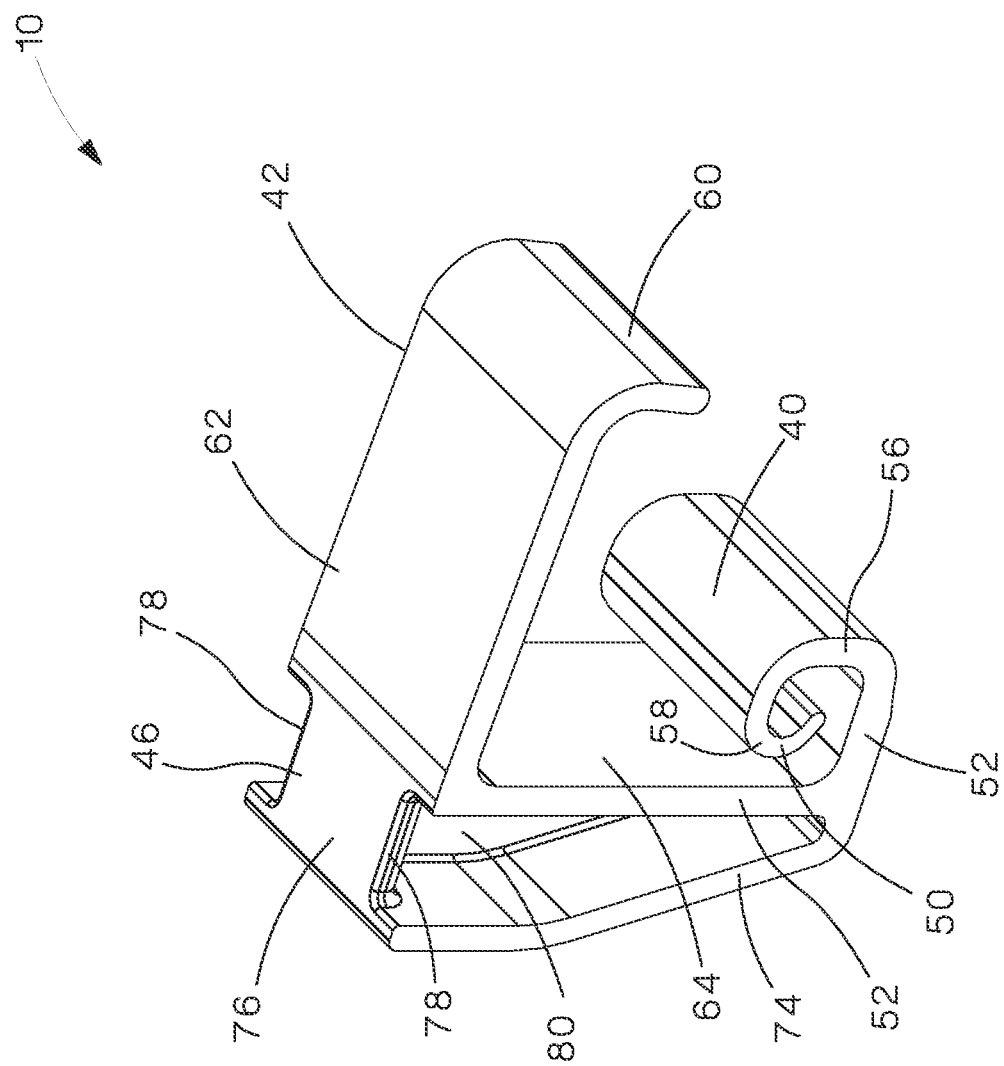
FIG. 1 illustrates a perspective view of the bracket for cable management according to one non-limiting exemplary embodiment of the present disclosure showing the bracket in an initial pre-assembled position.
Figure 2:
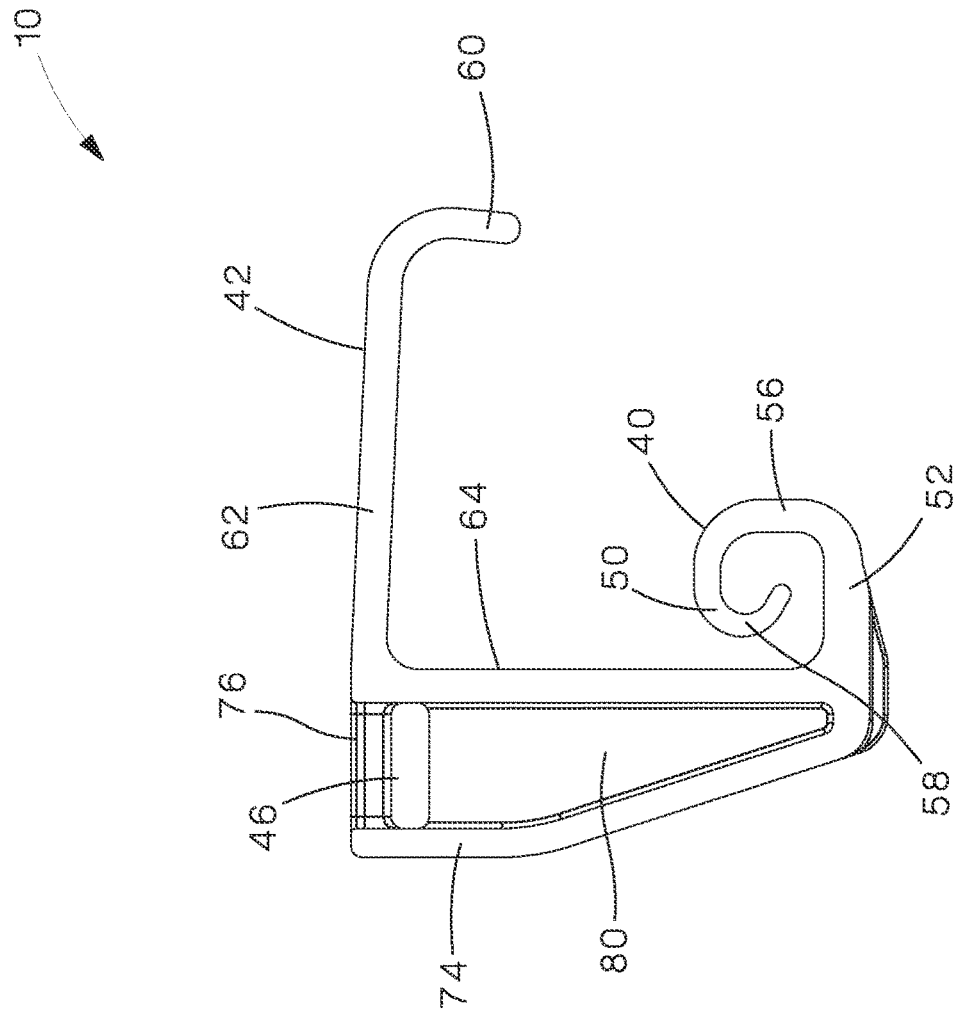
FIG. 2 is a side view of FIG. 1 showing the bracket in the initial preassembled position.

The bracket 10 of the present application allows a cable tie to be quickly and easily secured around the cable at 90-degrees while securing the cable to the ladder rung 12, without the additional time or cost for complex installation. FIGS. 1-2 illustrates a bracket 10 prior to being installed on a ladder rung 12. As shown in FIGS. 3-12, the bracket 10 can be easily snapped, positioned and secured onto a strut-style ladder rung 12 to secure the cable to the ladder rung 12.

As shown in FIGS. 3-12, each strut-style ladder rung 12 is formed having a cross-section being generally rectangular with an opening on one side. As illustrated, the strut-style ladder rung 12 may be generally square with generally equal sized sides and having the opening 30 on one side. The strut-style rung 12 has a generally horizontal upper beam 20 and opposite side beams 22, 24. Lower beam flanges 26, 28 extend from each of the side beams 22, 24 and define the opening 30 opposite the upper beam 20. However, the ladder rung 12 may have other beam configurations.

FIGS. 1-2 illustrate the bracket 10 in an initial pre-assembled position prior to the bracket 10 being secured on the ladder rung 12. The bracket 10 may be formed of plastic or nylon, or any suitable material. The bracket 10 is configured to attach to the ladder rung 12 without the need of additional fasteners.

The bracket 10 has a spring flange portion 40 sized to be inserted in the opening 30 of the ladder rung 12. The spring flange portion 40 provides a spring force against the lower beam flanges 26, 28 of the ladder rung 12. The bracket 10 also has latch flange portion 42 adapted to engage at least two sides of the ladder rung 12 in the latched position. A cable attachment portion 46 allows a cable tie to be secured to the bracket 10.

Figure 3:
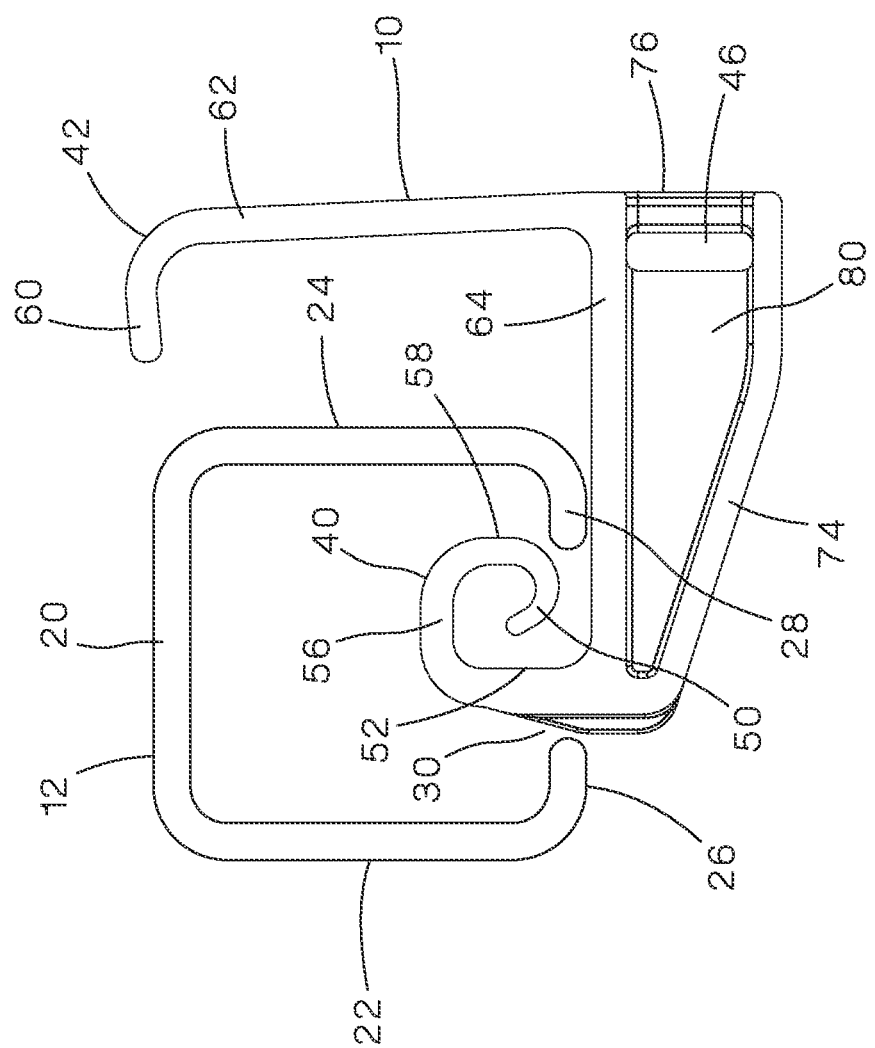
FIG. 3 illustrates a side view of the bracket in FIG. 1 showing the bracket and the ladder rung where the bracket is being oriented onto the ladder rung in a first pre-installed position.
Figure 4:
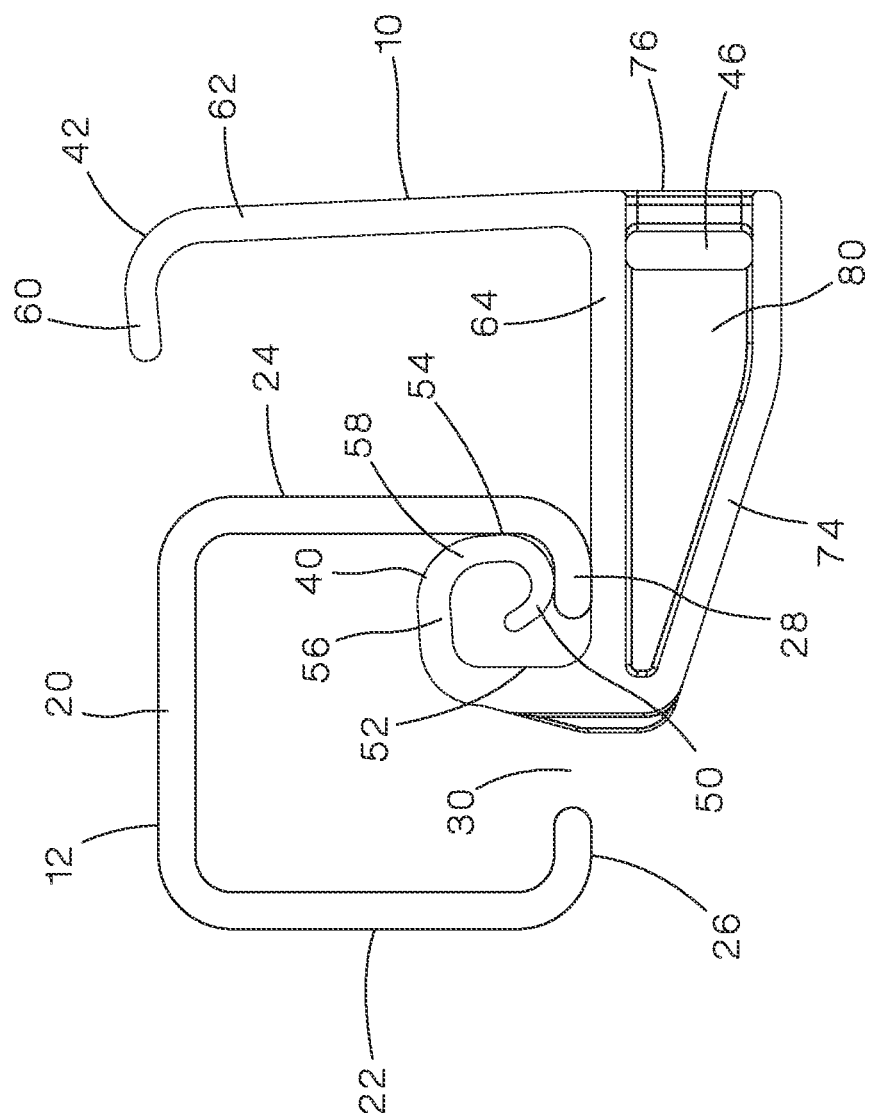
FIG. 4 illustrates the side view of the bracket in FIG. 3 showing the bracket and the ladder rung where the bracket is moved onto the ladder rung in a second pre-installed position.

As shown in FIGS. 3-4, a ladder rung 12 is being oriented onto the bracket 10 in pre-installed positions. The spring flange portion 40 is inserted in the opening 30 of the ladder rung 12. FIG. 3 illustrates the first initial position of the bracket prior to the bracket being rotated/secured on the ladder rack rung.

In FIG. 4, the bracket 10 is moved laterally to a second pre-installed position until the spring flange portion 40 contacts the side beam 24. The spring flange portion 40 has a hook portion 50 extending from a base 52 of the bracket 10. In the second pre-installed position, the hook portion 50 contacts the lower side beam 24 and the lower beam flange 28 of the ladder rung 12 is retained between the base 52 and the hook portion 50.

Figure 5:
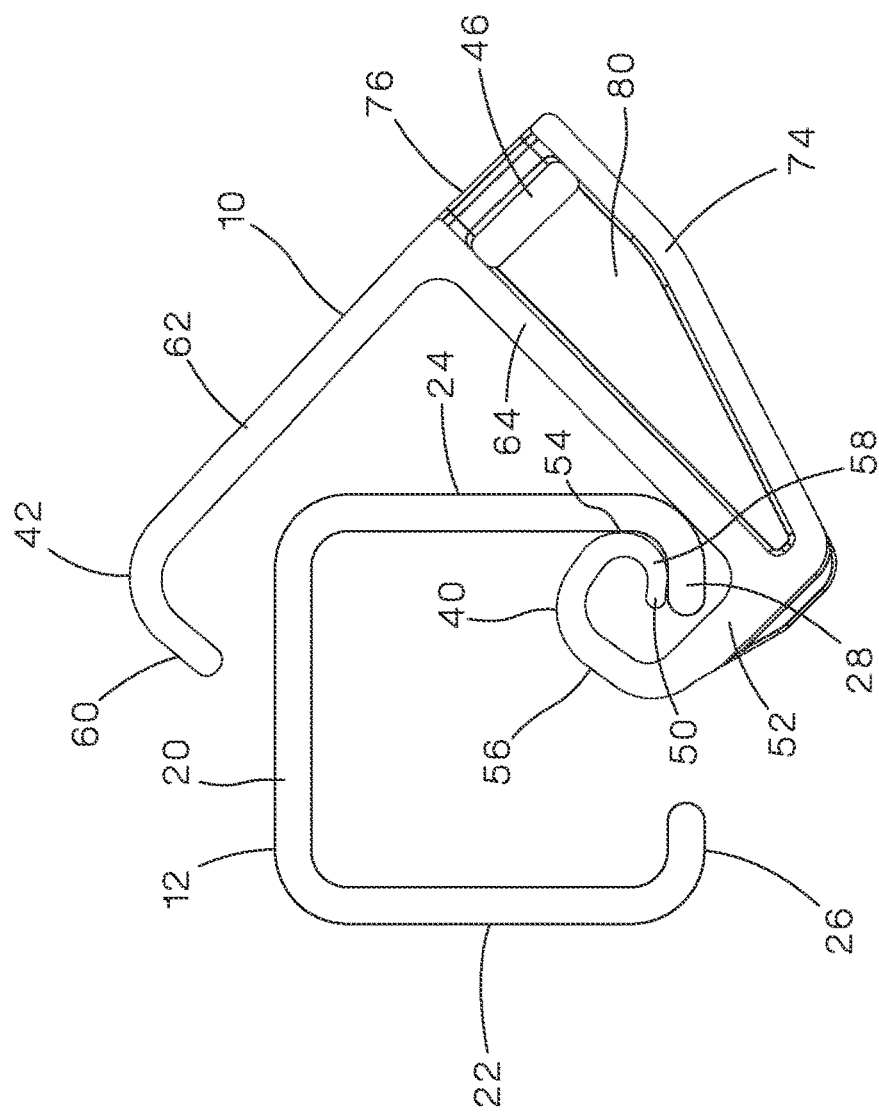
FIG. 5 illustrates the side view of the bracket in FIG. 4 showing the bracket and the ladder rung where the bracket is rotated onto the ladder rung in a third pre-installed position.
Figure 6:
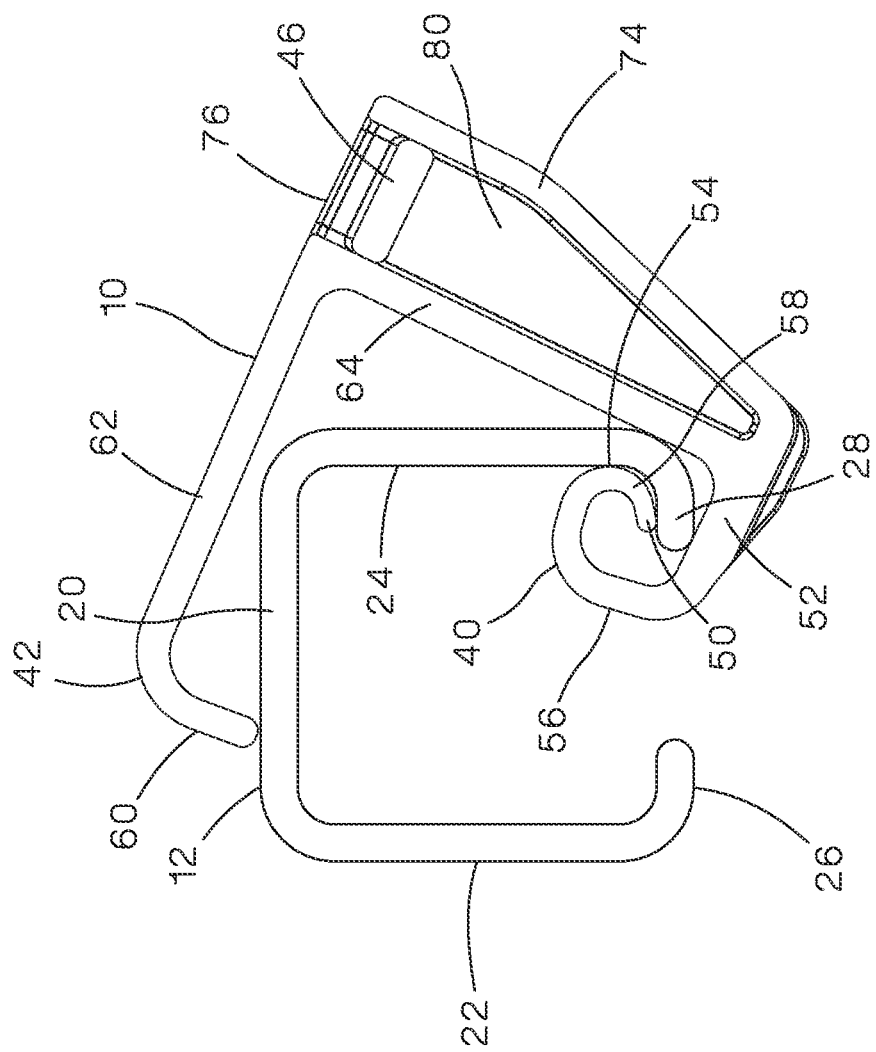
FIG. 6 illustrates the side view of the bracket in FIG. 5 showing the bracket and the ladder rung where the bracket is further rotated onto the ladder rung in a fourth pre-installed position.

FIGS. 5-6 show the bracket 10 as it is being rotated/secured onto the ladder rung prior to engagement of the latch flange portion 42. In FIGS. 5-6, the bracket 10 is still in the unlatched position and is not positively engaged or locked. The spring flange portion 40 is shaped to define a contact point 54 as the bracket is rotated to the latched position. The hook portion 50 of the spring has an upward segment 56 extending upward from the base 52 and a curved segment 58 that projects from the upward segment 56. The contact point 54 is defined along the curved segment 58 of the spring flange portion 40. As shown, the curved segment 58 extends approximately 180-degrees.

Figure 7:
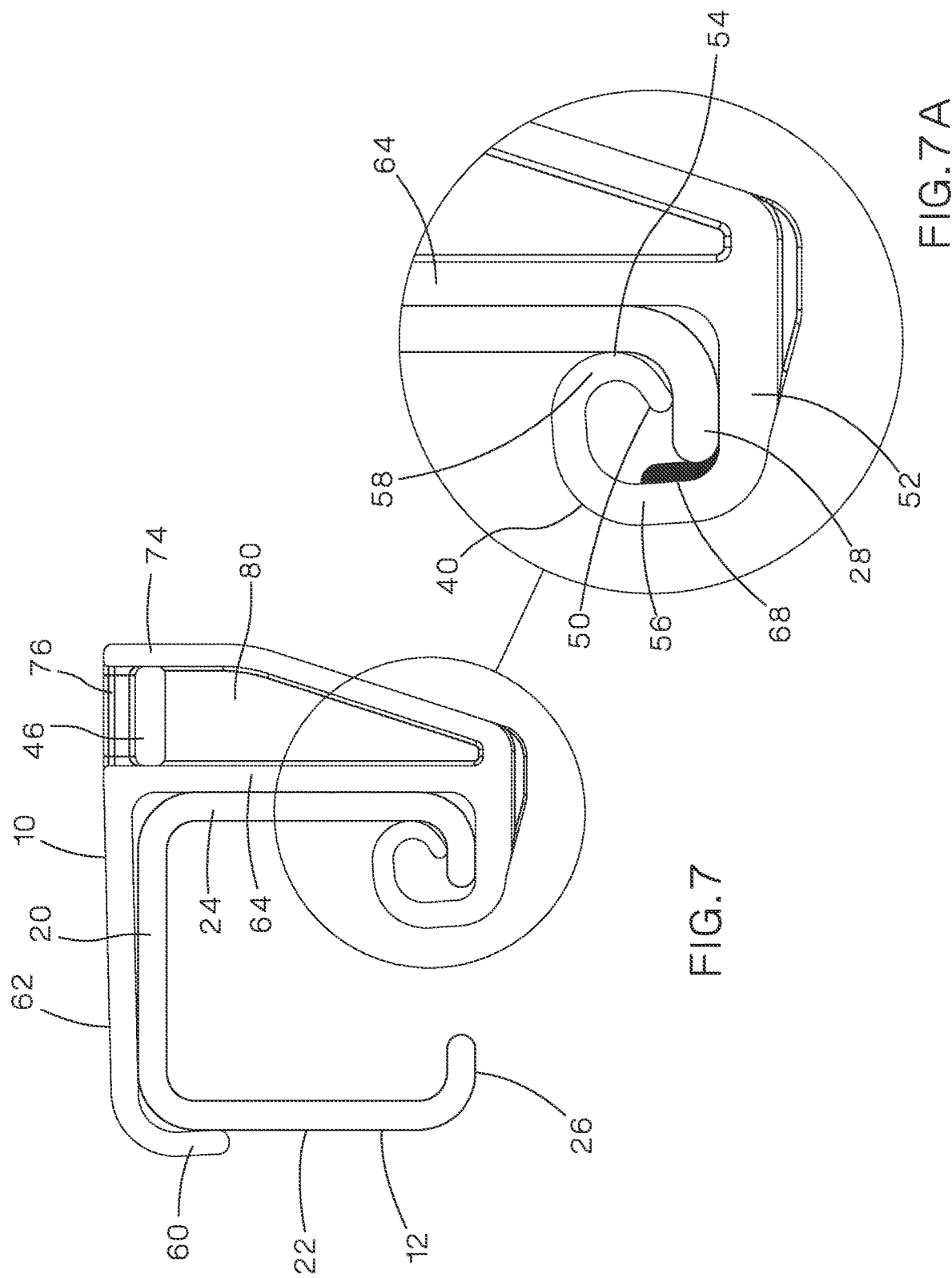
FIG. 7 illustrates the side view of the bracket in FIG. 6 showing the bracket and the ladder rung where the bracket is installed to the ladder rung and in the latched position.
Figure 8:
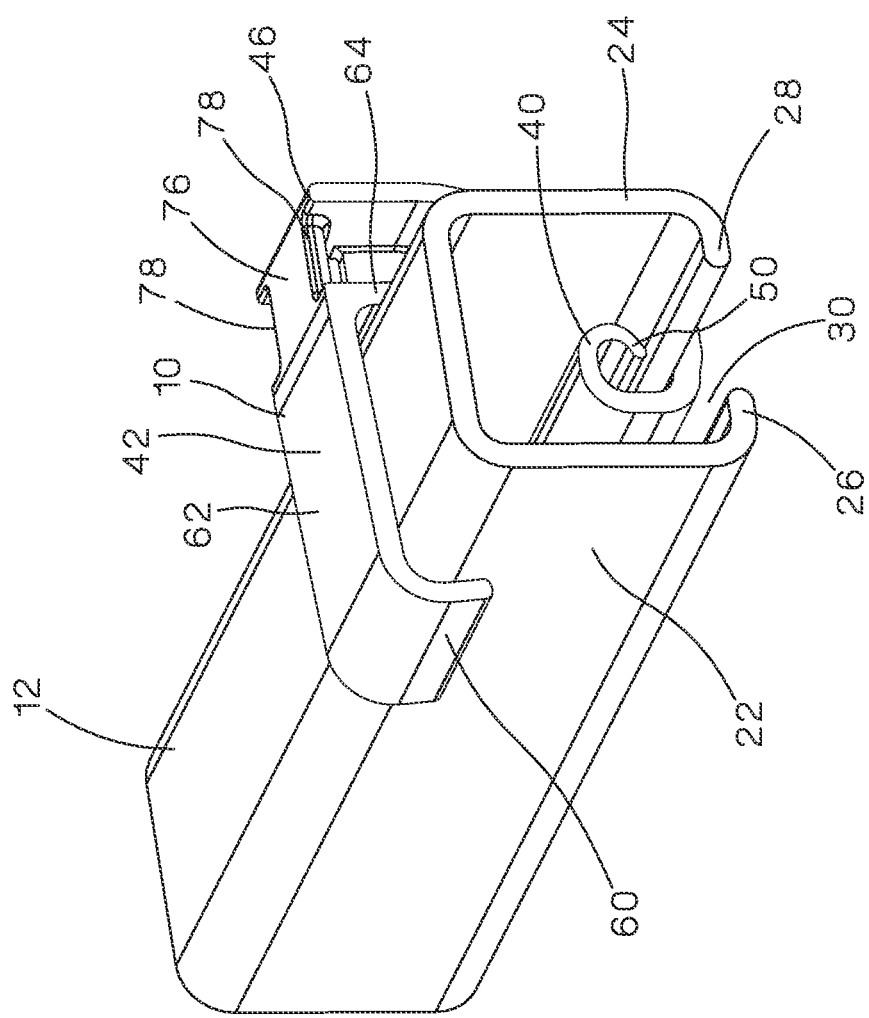
FIG. 8 illustrates side-perspective view of FIG. 7 showing the bracket and the ladder rung where the bracket is installed to the ladder rung and in the latched position.

FIGS. 7-8 show the bracket 10 secured to the ladder rung 12 in the latched position. The upper beam 20 and side beam 22 of the ladder rung are retained in the latched position by the latch flange portion 42 with an interference fit. The latch flange portion 42 is generally L-shaped and has a downward segment 60 extending from an upper arm segment 62. The upper arm segment 62 and the downward segment 60 retain two sides of the ladder rung 12 with an interference fit. For example, the interference fit may be a snap fit where the downward segment 60 deflects as the ladder rung 12 rotates to the latched position, and then the downward segment 60 snaps back into secure engagement with the side beam 22 of the ladder rung 12. The bracket snaps onto the ladder rung reducing the overall installation time.

The bracket 10 has a vertical arm segment 64 extending between the base 52 and the upper arm segment 62. In the latched position, the upper beam 20 of the ladder rung 12 contacts the upper arm segment 62, the downward segment 60 contacts the side beam 22 and provides pressure points that ensure the bracket 10 remains latched to the ladder rung 12. When the ladder rung is in the latched position, the opposite side beam 24 abuts the vertical arm segment 64. Along with the spring flange portion 40, in the latched position, the side beam 24 of the ladder rung 12 is retained between the vertical arm segment 64 and the curved segment 58. Further, the lower beam flange 28 of the ladder rung is retained between the curved segment 58 and the base 52 in the latched position.

As shown in the enlarged view in FIG. 7A, a non-slip liner 68 may be incorporated in the spring flange portion 40. The liner 68 may be added to the inside surface of the upward segment 56 to provide additional resistance between the bracket 10 and the ladder rung 12 to retain the bracket 10 in the latched position.

Figure 9:
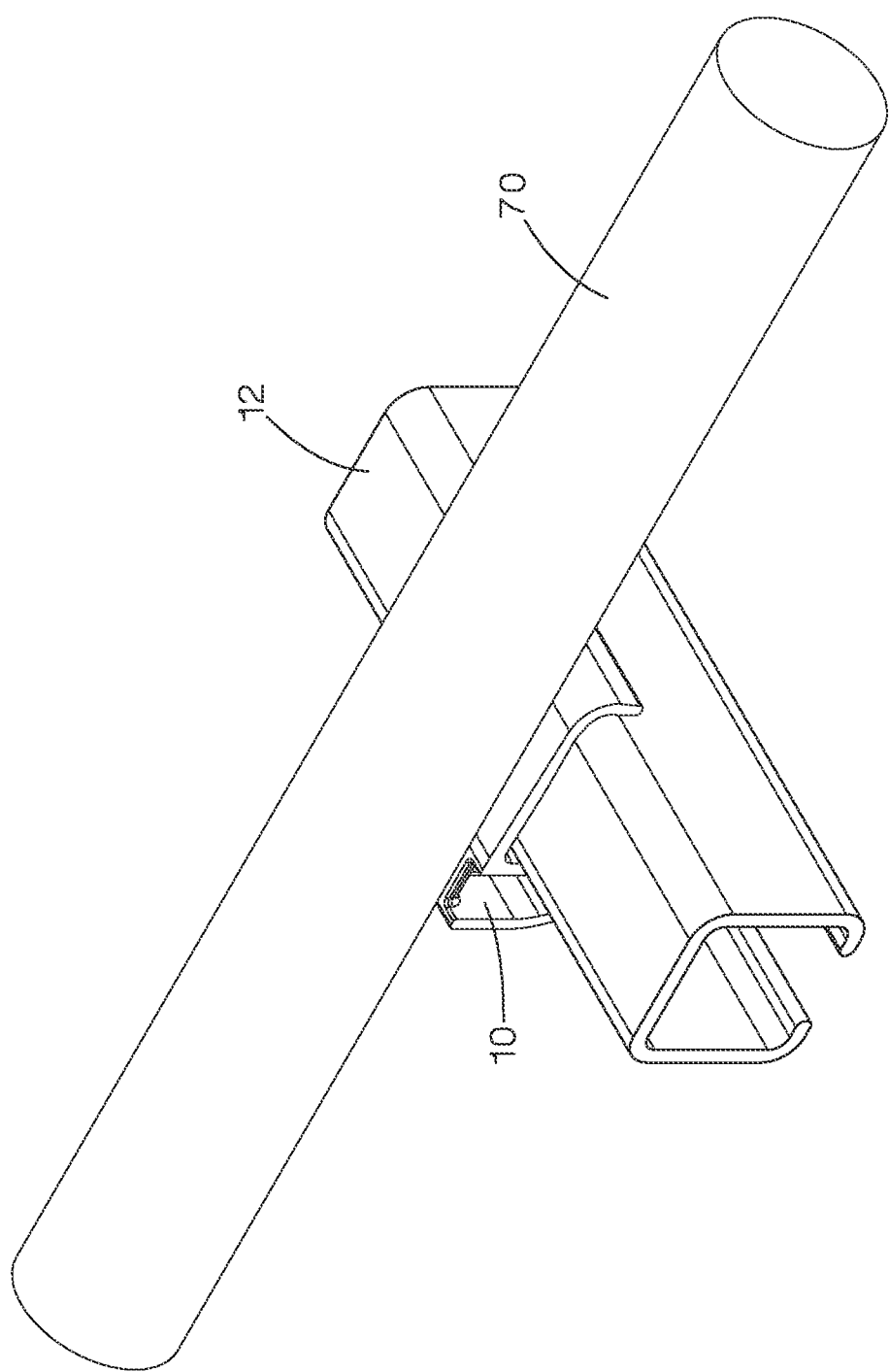
FIG. 9 illustrates a left-side perspective view of FIG. 7 showing the bracket and the ladder rung where the bracket is installed to the ladder rung and in the latched position, and also showing a cable being positioned on the bracket.
Figure 10:
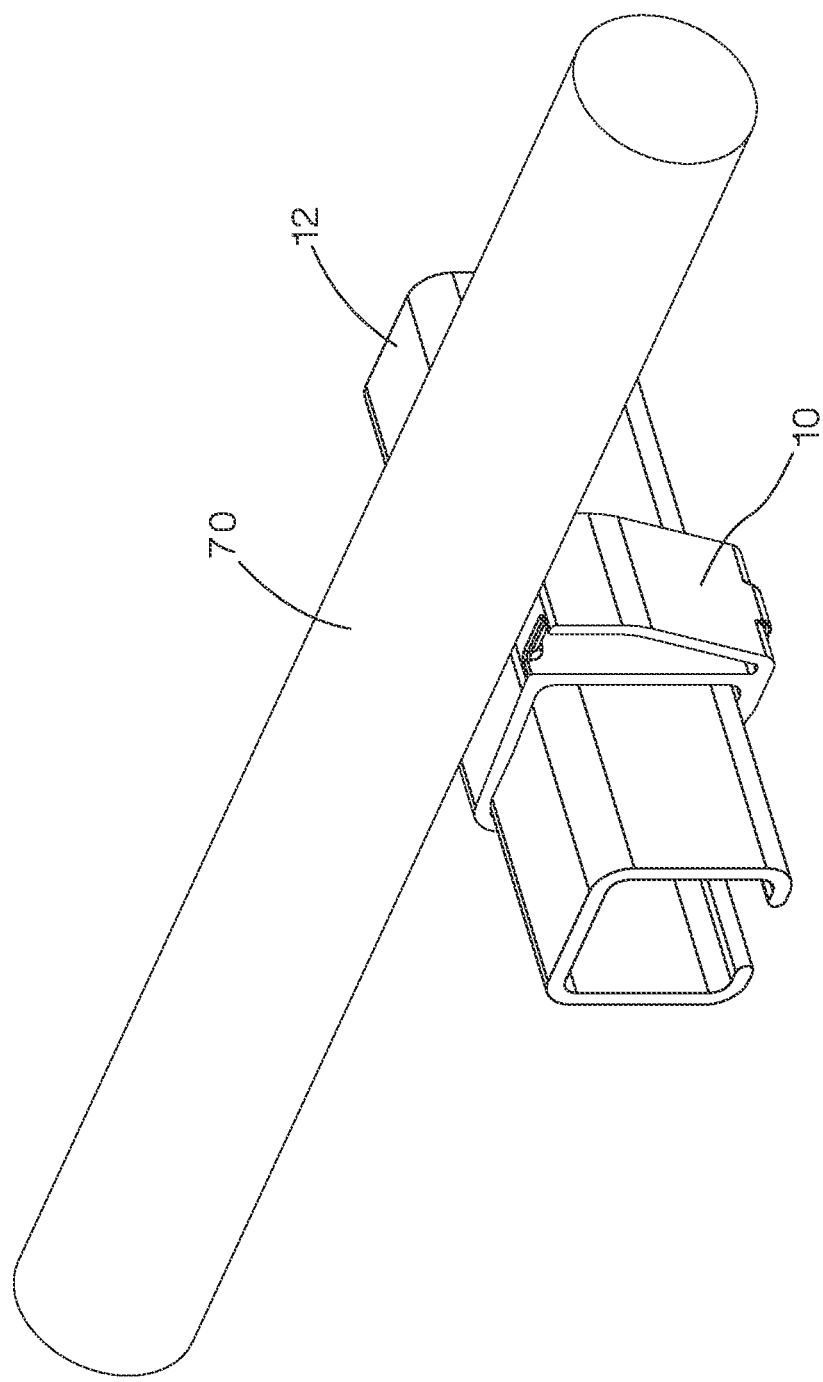
FIG. 10 illustrates a right-side perspective view of FIG. 9 showing the bracket and the ladder rung where the bracket is installed to the ladder rung and in the latched position, and also showing the cable being positioned on the bracket.

FIGS. 9-10 show a cable 70 being positioned on the bracket 10 and ladder rung 12.

Figure 11:
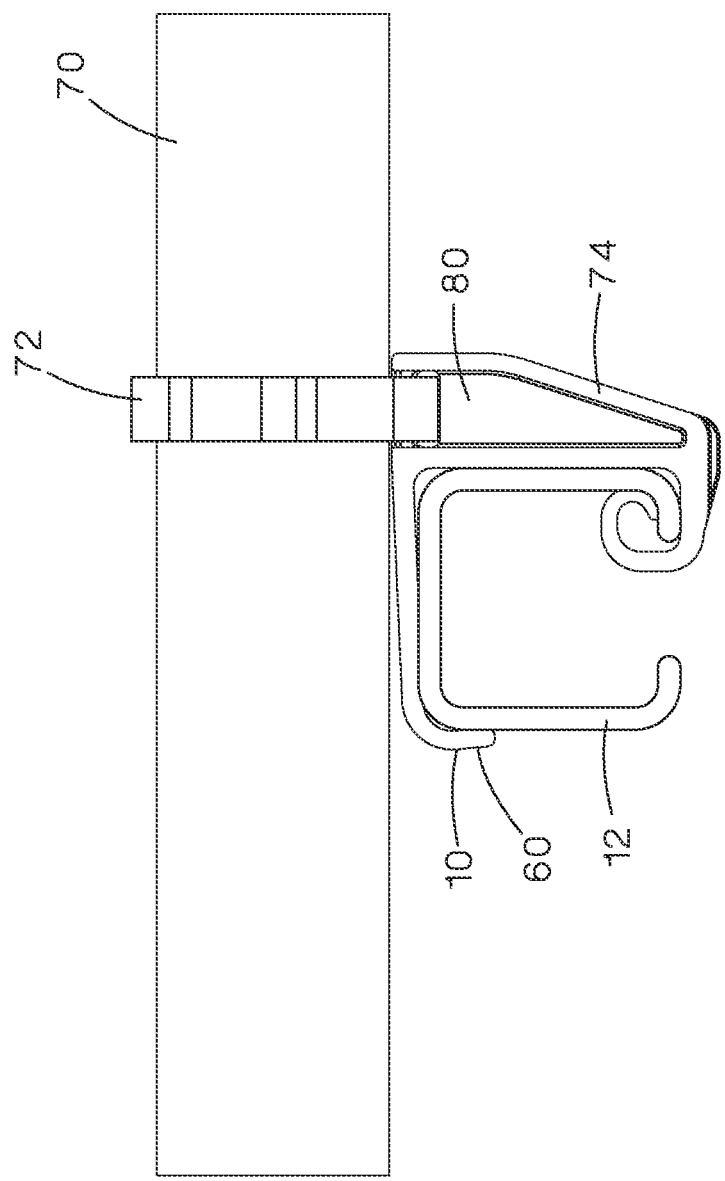
FIG. 11 illustrates the side view of FIG. 10 showing the bracket and the ladder rung where the bracket is installed to the ladder rung and in the latched position, and the cable being positioned on the bracket and secured with a cable tie.
Figure 12:
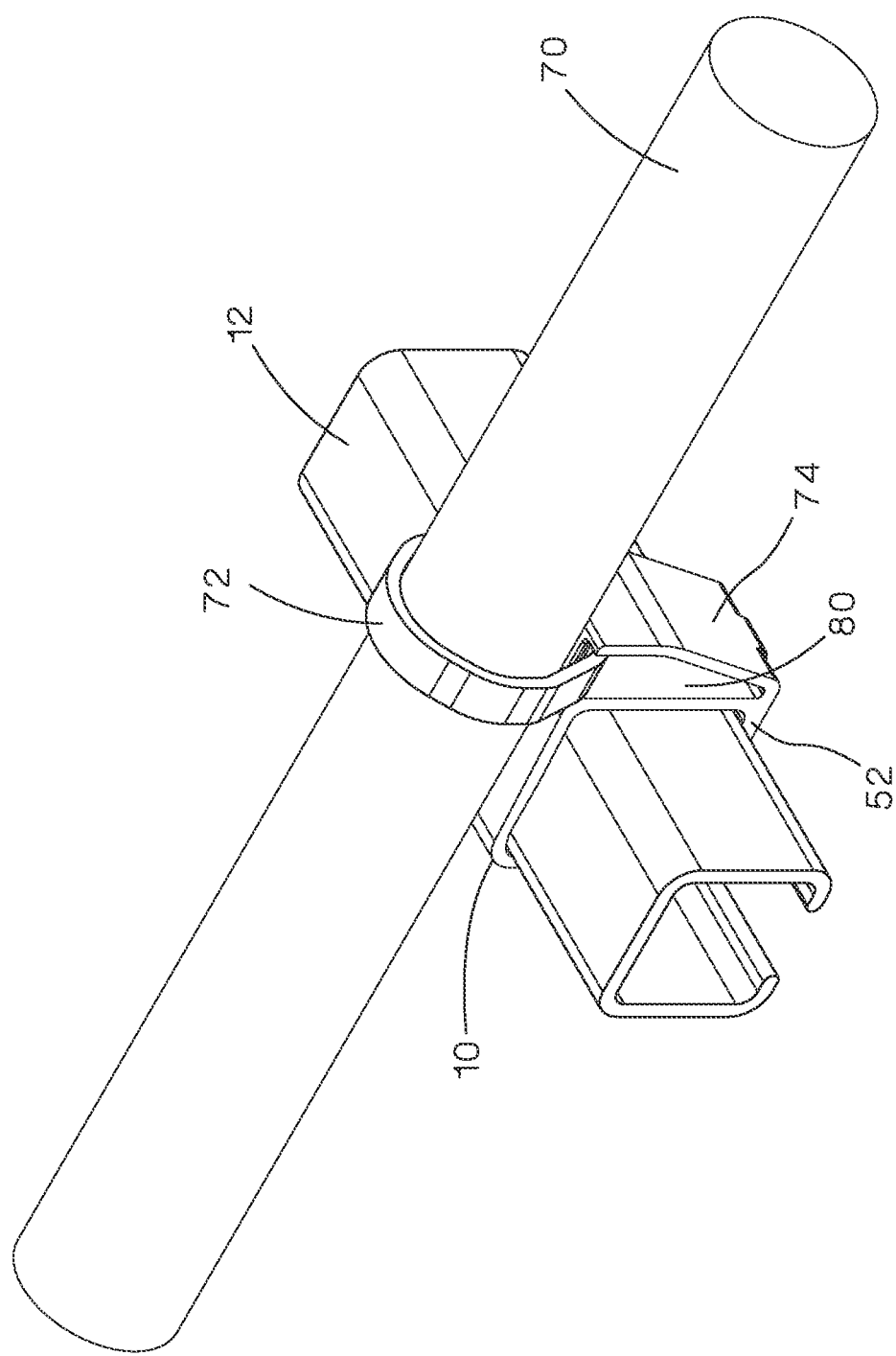
FIG. 12 illustrates the right-side perspective view of FIG. 11 showing the bracket and the ladder rung where the bracket is installed to the ladder rung and in the latched position, and the cable being positioned on the bracket and secured with a cable tie.

Once the bracket 10 is locked to the ladder rung 12, a cable tie 72 may be secured to the bracket 10 to attach the cable 70, as shown in FIGS. 11-12. The cable attachment portion 46 allows the cable tie 72 to be quickly and easily secured to the cable 70 at 90-degrees. The cable 70 is generally perpendicular to the ladder rung 12.

As illustrated in FIGS. 1-2, the cable attachment portion 46 has an upper cable segment 76 extending opposite the upper arm segment 62 and adapted to receive the cable tie 72. The upper cable segment 76 may have notches 78 that retain the cable tie 72 to prevent the cable tie 72 from sliding off the upper cable segment 76 once the cable tie 72 is tightened.

The cable attachment portion 46 also includes a cable attachment arm 74 that extends between the base 52 to the upper cable segment 76. The cable attachment arm 74 defines a cable tie slot 80. Alternatively, the cable tie slot 80 may be sized to receive the cable tie 72. The cable tie slot 80 is configured to be generally parallel to the ladder rung 12 so the cable tie 72 can be secured concentric to a circumference of the cable 70, and the cable tie slot 80 is oriented perpendicular, or 90-degrees to the length of the cable. The cable 70 is oriented generally perpendicular to the ladder rung 12.

The upper cable segment 76 may be flat or planar to provide support for the cable 70. The cable tie slot 80 is offset below the upper cable segment 76. The upper cable segment 76 may also be generally coplanar with the upper arm segment 62 to provide a larger and continuous support surface for the cable 70. The cable tie slot 80 positions the cable tie 72 near the top of the ladder rung and creates an easily accessible attachment point for the cable tie 72. The cable tie slot 80 allows the bracket to utilize standard size cable ties to secure the cable, allowing for standard installation procedures and tools.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A bracket for securing a cable to a strut-style ladder rung having a rectangular cross-section with an opening along a lower side, the bracket comprising:
    a base and a vertical arm segment extending from the base;
        a spring flange portion extends from one end of the base, the spring flange portion is sized to be inserted in the opening of the ladder rung, wherein the spring flange portion provides a spring force against the lower side of the ladder rung;
        a latch flange portion adapted to engage at least two sides of the ladder rung in a latched position, wherein the latch flange portion has an upper arm segment that is parallel to the base; and a cable attachment portion for receiving a cable tie, wherein the cable attachment portion has a cable attachment arm and an upper cable segment, the cable attachment arm extends from one end of the base to the upper cable segment, the upper cable segment is coplanar with the upper arm segment for providing a continuous support surface for the cable.

2. The bracket of claim 1, wherein the spring flange portion comprises a hook portion extending from the base of the bracket, wherein the hook portion is configured to engage the lower side of the ladder rung.

3. The bracket of claim 2, wherein the spring flange portion is shaped to define a contact point as the bracket is rotated between an initial position and the latched position, whereby the spring flange portion is adapted to engage the lower side of the ladder rung.

4. The bracket of claim 3, wherein the hook portion of the spring flange portion has a curved segment, wherein the contact point is defined along the curved segment.

5. The bracket of claim 4, wherein the curved segment extends approximately 180-degrees.

6. The bracket of claim 4, wherein the spring flange portion has an upward segment extending upward from the base of the bracket, wherein the curved segment extends from the upward segment.

7. The bracket of claim 6, wherein in the latched position, the lower side of the ladder rung is retained between the curved segment and the base.

8. The bracket of claim 1, wherein the vertical arm segment extends between the base and the upper arm segment, whereby a side of the ladder rung is retained between the vertical arm and a curved segment of the spring flange portion when the ladder rung is in the latched position.

9. The bracket of claim 1, wherein the latch flange portion is generally L-shaped and has a downward segment extending from the upper arm segment, wherein the upper arm segment and downward segment retain two sides of the ladder rung in the latched position with an interference fit.

10. The bracket of claim 1, wherein the cable attachment portion has a cable slot to receive the cable tie.

11. The bracket of claim 10, wherein the cable slot is configured to be parallel to the latch flange portion, whereby the cable tie is secured concentric to a circumference of the cable where the cable is oriented generally perpendicular to the ladder rung.

* * * * *